(12) United States Patent
Knight et al.

(10) Patent No.: US 9,415,651 B2
(45) Date of Patent: Aug. 16, 2016

(54) REAR SUSPENSION FOR SWATHER TRACTOR

(71) Applicant: MacDon Industries Ltd., Winnipeg (CA)

(72) Inventors: Timothy C. Knight, Winnipeg (CA); Blaine J. McFarlane, Winnipeg (CA)

(73) Assignee: MacDon Industries Ltd., Winnipeg, MB (CA)

( * ) Notice: Subject to any disclaimer, the term of this patent is extended or adjusted under 35 U.S.C. 154(b) by 137 days.

(21) Appl. No.: 14/282,686

(22) Filed: May 20, 2014

(65) Prior Publication Data

US 2015/0336437 A1 Nov. 26, 2015

(51) Int. Cl.
| | |
|---|---|
| *B60G 11/00* | (2006.01) |
| *B60G 21/05* | (2006.01) |
| *B60G 3/00* | (2006.01) |
| *B60G 3/02* | (2006.01) |
| *B60G 11/22* | (2006.01) |

(52) U.S. Cl.
CPC ...... *B60G 11/00* (2013.01); *B60G 3/00* (2013.01); *B60G 3/02* (2013.01); *B60G 11/22* (2013.01); *B60G 21/05* (2013.01); *B60G 2202/143* (2013.01); *B60G 2300/082* (2013.01); *B60Y 2200/221* (2013.01)

(58) Field of Classification Search
CPC ........ B60G 11/00; B60G 21/05; B60G 11/22; B60G 3/02; B60G 3/00; B60G 2202/143; B60G 2300/082; B60B 33/045; B60Y 2200/221
See application file for complete search history.

(56) References Cited

U.S. PATENT DOCUMENTS

| | | | | |
|---|---|---|---|---|
| 1,745,992 A | * | 2/1930 | Herold | B60B 33/045 16/44 |
| 4,462,138 A | * | 7/1984 | Black | B60B 33/045 16/44 |
| 4,669,256 A | * | 6/1987 | Ermacora | A01D 34/246 56/13.6 |
| 5,394,589 A | * | 3/1995 | Braeger | B60B 33/0028 16/44 |
| 6,149,169 A | * | 11/2000 | Chelgren | A61G 5/10 280/647 |
| 6,409,196 B1 | * | 6/2002 | McFarland | A61G 5/10 16/44 |
| 6,532,623 B1 | * | 3/2003 | Watanabe | B60B 33/0007 16/35 D |
| 7,077,220 B2 | | 7/2006 | Dunn | |
| 7,252,169 B2 | | 8/2007 | McLean | |
| 8,523,208 B2 | * | 9/2013 | Rezania | B60G 3/145 267/257 |
| 8,814,191 B2 | * | 8/2014 | Lindtner | B60G 3/28 280/124.163 |
| 2009/0174166 A1 | | 7/2009 | Sloan et al. | |

* cited by examiner

*Primary Examiner* — Joseph Rocca
*Assistant Examiner* — Joselynn Y Sliteris
(74) *Attorney, Agent, or Firm* — Adrian D. Battison; Ade & Company Inc.

(57) ABSTRACT

A rear castor wheel for a tractor includes a beam carried on a fork which connects to a castor mounting assembly attached to a rear pivotal beam of the tractor. A suspension system connects the fork to the mounting assembly to provide suspension movement and includes a first transverse plate assembly attached to the mounting assembly intersected by a second plate assembly attached across the two sides of the fork. The plates are connected by a single elastomeric block located on a first side of the axis remote from the beam and two elastomeric blocks located between the first and second plate assemblies on a side of the axis closer to the beam so that upward movement of the beam causes compression of the first and second elastomeric blocks which are shaped such that the internal strain of the block as the beam moves upwardly is substantially uniform through the block.

19 Claims, 5 Drawing Sheets

REAR SUSPENSION FOR SWATHER TRACTOR

This invention relates to a rear suspension system for a swather tractor.

BACKGROUND OF THE INVENTION

In U.S. Pat. No. 7,077,220 (Dunn) issued Jul. 18, 2006 and assigned to the present Assignees is disclosed a hydrostatic agricultural tractor used as a self-propelled swather tractor. This uses the typical construction for such tractors which has front ground wheels mounted on the frame at fixed angles parallel to each other and parallel to a center line of the frame and rear ground wheels mounted on a castor. Each of the front ground wheels is driven by a respective drive motor which allows variable speed in both the first and second directions such that steering of the tractor is effected by a differential in speed between the front wheels with the rear wheels following the steering in a castoring action. A pair of damper cylinders is provided, each connected between a bracket on a rear beam of the frame and a lever in the castor plane of the castor so as to provide a damping force tending to restrict rotation of the respective second wheel about the respective vertical pivot axis with the damping force at a maximum value when the rear wheels are parallel to the center line in either the forward or reverse directions.

Such hydrostatically driven tractors used primarily for swathing are commonly used and readily available. The tractor carries at a forward end on suitable sprung supports a header for cutting standing crop with the crop being transported on the header to a suitable discharge location generally centrally of the tractor for forming a swath in the field from the cut crop.

Such tractors generally include a pair of front wheels just behind the header which are fixed to the frame of the tractor so that they remain at an angle parallel to each other and parallel to a center line of the tractor, The tractor is supported at the rear end by a pair of castor wheels which are attached to a beam which is typically pivotally connected to the frame at a center horizontal pivot point. The beam is supported relative to the ground by the castor wheels at the ends of the rear beam so that the wheels trail behind a vertical pivot mount for the wheels and are free to swivel through 360° around the pivot mount.

The front wheels only are driven and are driven in a manner which allows full control in the forward and reverse directions so that steering is generally effected by a differential speed between the two front wheels with the rear wheels following in the conventional castoring action.

It is also known that such tractors can travel more effectively at high speed when reversed in direction so that the driven wheels are at the rear and the castor wheels at the front. The castor wheels of course rotate through 180° to trail behind the vertical pivot which is now forward of the castor wheels as the tractor moves at relatively high speed in this reversed direction.

Up to now many such tractors use as the rear suspension of the rear castor wheels the simple pivoting rear beam and while speeds have been relatively low, this has been acceptable. Of course the tires themselves also provide flexure which contributes to the suspension. However the use of only the tires as a suspension in rough terrain can cause severe pitching leading to significant fore and aft acceleration of the operator station.

Attempts have been made to provide a more effective suspension of the rear beam and one example is shown in U.S. Pat. No. 7,252,169 (McLean) issued Aug. 7, 2007 and assigned to CNH. This provides an arrangement in which the rear beam is split into two components each having an air spring to absorb shocks. This arrangement has obtained some acceptability but is relatively complex and provides a large unsprung mass.

Another arrangement is shown in U.S. Published application 2009/0174166 (Sloan et al) assigned to Deere which shows a suspension arrangement for a swather tractor which includes a frame and a rear beam rigidly carried by and substantially immovable relative to the frame. The suspension arrangement includes a caster wheel assembly having a shaft, a wheel arm, a suspension and a caster wheel. The shaft is mounted on an outboard end of the rear beam. The caster wheel is coupled with a lower end of the wheel arm. The suspension is in the form of a torsion spring including an outer tube defined by two separate parts connected together, an inner member, and a plurality of elastomeric members interposed between the outer tube and the inner member. The outer tube is rotatably clamped to a carrier which is pivotally connected to the beam, and the inner member is coupled with an upper end of the wheel arm.

SUMMARY OF THE INVENTION

It is one object of the invention to provide an improved tractor of the above type including a suspension system for the rear wheels.

According to one aspect of the invention there is provided a ground wheel assembly for supporting an agricultural vehicle relative to the ground comprising:

a ground wheel having an beam;

a support arm having the beam attached at a lower end of the support arm;

a mounting assembly for attachment to a frame member of the agricultural vehicle;

and a suspension system for connecting the support arm to the mounting assembly to provide generally up and down movement of the beam and the wheel carried thereby relative to the mounting assembly and the frame member attached thereto;

the suspension system comprising:

a first plate assembly attached to the mounting assembly;

a second plate assembly attached to the support arm;

the first and second plate assemblies being arranged for relative pivotal movement about an axis generally parallel to the beam in response to up and down movement of the beam;

a first elastomeric block arrangement located between the first and second plate assemblies on a first side of the axis more remote from the beam;

a second elastomeric block arrangement located between the first and second plate assemblies on a second side of the axis closer to the beam;

the first and second elastomeric block arrangements being arranged such that upward movement of the beam causes compression of the first and second elastomeric block arrangements.

The above suspension arrangement is particularly applicable to a tractor arrangement which has the wheel as a castor wheel and also has the wheel mounted on a pivotal transverse rear beam. However the wheel assembly can be used in other agricultural situations where there is no castor and where the wheel is directly connected to a fixed frame member of the vehicle.

Preferably the first and second plate assemblies are connected only by the elastomeric block arrangements such that the location of the pivot axis is determined by the compression of the elastomeric block arrangements and there is no direct pivot connection.

Preferably the first and second plate assemblies are generally planar and intersect adjacent the pivot axis in an X-shape. However other configurations are possible.

Preferably one of the first and second plate assemblies is continuous through the pivot axis and the other is separated at the axis into two separate components which are connected by components outside said one of the first and second plate assemblies. In this way there is no direct connection between the plates and the location of the pivot axis is defined by the shape and action of the blocks as they are compressed.

Preferably it is the first plate assembly which is continuous through the pivot axis and the second plate assembly is separated at the axis into two separate components which are connected by two spaced side walls or forks of the support arm so that the spaced side walls or forks each extend to the beam and are connected to respective ends of the beam. However other mounting arrangements are possible where the fist plate is separated and connected at the sides.

Preferably one of the elastomeric block arrangements comprises a single block and the other of the elastomeric block arrangements comprises a pair of side by side blocks. This provides a greater volume of the elastomeric material on the inside of the pivot where it is required to provide the necessary forces, thus balancing the forces within the three blocks selected. The three-block configuration is arranged to optimize the layout and packaging of the structural members while also providing lateral stiffness.

Preferably each elastomeric block arrangement comprises a block of an elastomeric material having a first face attached to the first plate assembly and a second face attached to the second plate assembly where each of the first and second faces preferably includes a flange portion projecting outwardly to define the face of the block which is of larger dimension than a cross section of the block adjacent the face. Preferably the face is bonded to the plate assembly and the flange is bolted to the plate assembly to provide additional connection forces. This spreads the load at the face to ensure that the larger loads at the face are properly accommodated and transferred from the plates into the blocks.

The blocks are preferably wedge-shaped and arranged such that the elastomer strain as the beam moves upwardly is substantially uniform through the block. This can be achieved in part by shaping the outermost free surface of each block lying in an axial plane of the axis and spaced from the axis so that it is convexly curved and by shaping the outer surface of each block lying in a radial plane of the axis and spaced from the axis so that the surface is concavely curved and bulges substantially in an outward direct as the block is compressed.

Preferably the mounting link is arranged to allow rotation of the wheel around the pivot axis so that the tractor can move in the direction of forward working movement with the first pair of ground wheels forward and the second pair of ground wheels trailing and in a second direction of movement opposite to the direction of forward working movement with the second pair of ground wheels forward and the first pair of ground wheels trailing.

Preferably each of the first pair of ground wheels is driven by a respective drive motor which allows variable speed in both the first and second directions such that steering of the tractor is effected by a differential in speed between the first wheels with the second wheels following the steering in a castoring action.

Preferably there is provided a pair of damper cylinders each connected between the frame and a respective one of a pair of levers where each lever is arranged at a respective one of the castor assemblies so as to provide a damping force tending to restrict rotation of the respective second wheel about the respective vertical pivot axis.

Preferably the damper cylinders and the levers are arranged such that the damping force for each castor assembly varies at different angles around the vertical pivot axis due to changes in mechanical advantage as the lever pivots around the vertical pivot axis and is at a maximum value when the second wheels are parallel to the center line and the tractor is moving in the direction of forward working movement and is at a maximum value when the second wheels are parallel to the center line and the tractor is moving in the opposite direction.

Preferably the mounting link includes a pair of parallel forks having upper ends of the forks connected to respective ends of the bottom transverse member and carry at a lower ends of the forks between the forks the transverse beam of the wheel.

Preferably the sleeve is defined by the bottom transverse member of the pivot member and the rod extends between the upper ends of the forks.

The torsion arm suspension system described herein is simple with few moving parts. The two rear caster wheels can move independently of each other while remaining connected through a pivoting beam connected to the main frame of the tractor. This arrangement provides greater articulation and requires less strength than an arrangement using a fixed rear beam, particularly at the area where the beam is connected to the frame. The arrangement also provides a reduced shock loading of the rear beam and caster components. The suspension can react faster due to less mass of the suspension components. The suspension provides dampening in some cases without the need for hydraulic shock absorbers. The elastomer will inherently help to dampen the suspension but additional dampening, like a shock absorber, may be provided.

It may be necessary in some cases to limit the rotation of the suspension to prevent excess loading of the elastomeric parts. This can be provided by a stop member arranged to limit the rotation. In normal operation there will be some type of weight (either a header, trailer or weight box) that will reduce load on the castor wheels. If this weight is removed, the machine must still be able to function with much increased load on the castor wheels.

BRIEF DESCRIPTION OF THE DRAWINGS

One embodiment of a swather tractor according to the present invention is described hereinafter and shown in the accompanying drawings in which.

DETAILED DESCRIPTION

Figure 1:
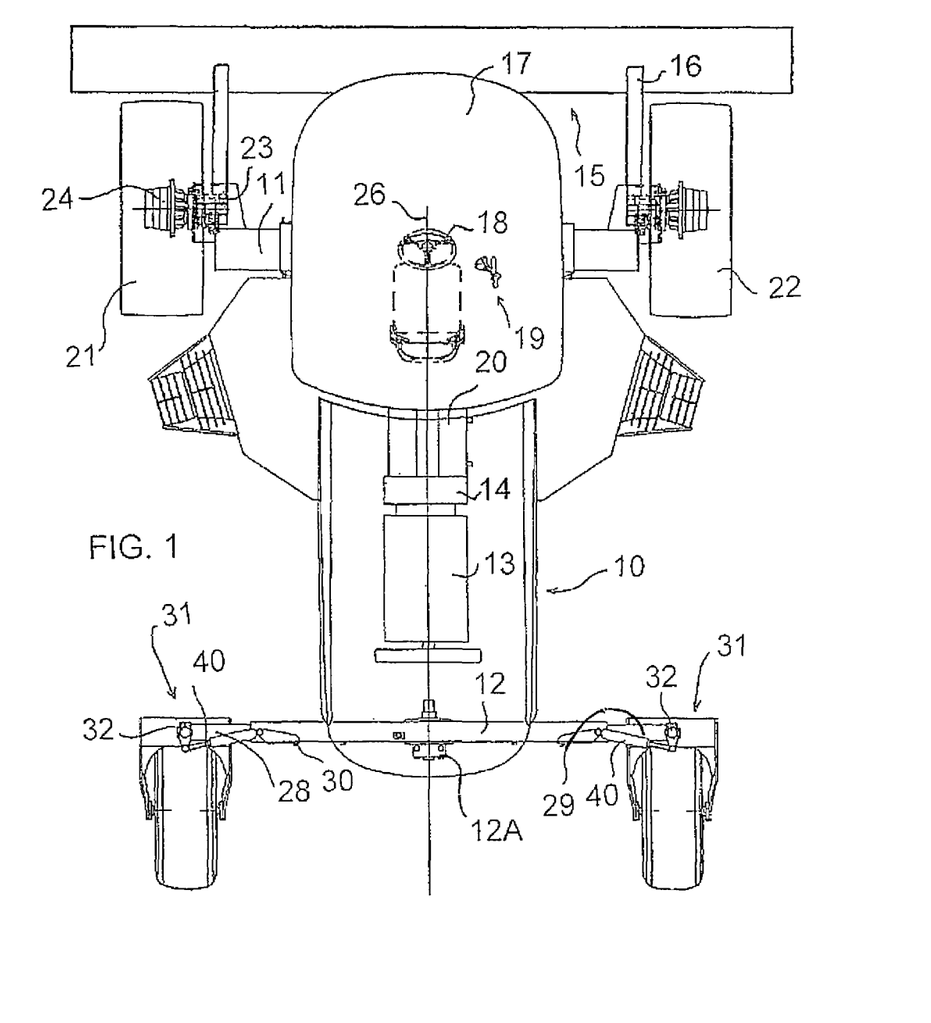
FIG. 1 is a top plan view of a tractor according to the present invention showing the general configuration.
Figure 2:
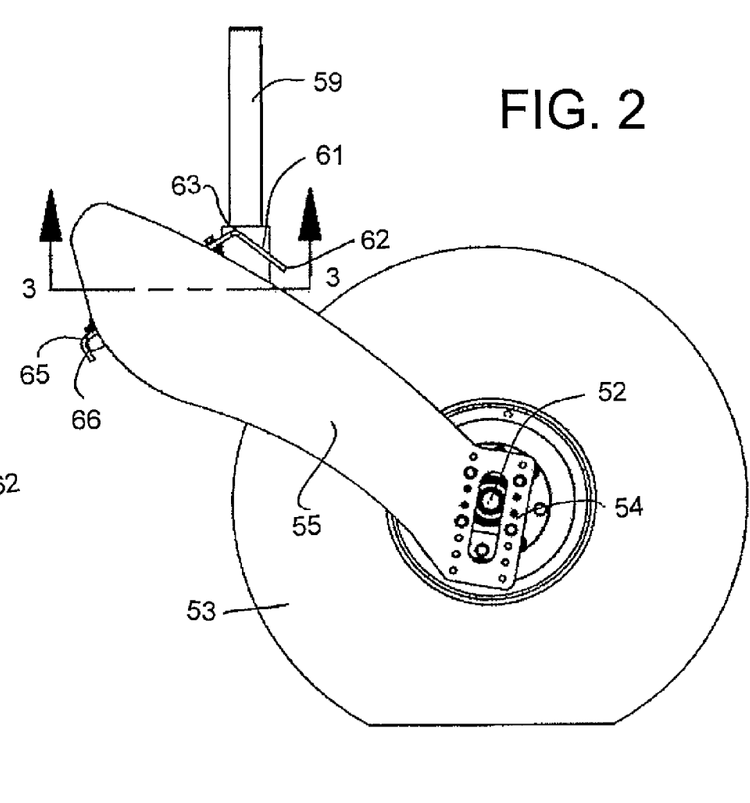
FIG. 2 is a side elevational view of the rear wheel of the tractor of FIG. 1.

In FIG. 1 is shown a tractor of the above type which includes a frame 10 with a front beam 11 and a rear beam 12. On the frame 10 is mounted a motor 13 driving a gear box and pump assembly schematically indicated at 14 for communicating hydraulic drive fluid to the various components of the tractor for propelling the tractor and for driving an implement 15 mounted on the tractor. in one example, the engine drives a gearbox at the rear of the engine that splits the power to two pump assemblies. One pump assembly powers two motors (one for each wheel) for traction drive and each pump controls one wheel. The other pump assembly powers four motors (two for header drive, one for lift functions and one providing supercharge oil). In the embodiment shown the implement is a header arranged for cutting a standing crop with the header carried on support arms 16 mounted on the tractor at the forward end in conventional manner. The tractor includes a cab 17 including steering 18 and control elements 19 operable by the driver with those control elements and steering acting to communicate control movements to a fluid control system generally indicated at 20 which supplies the fluid to the various elements to be driven.

The tractor includes first wheels 21 and 22 mounted on legs 23 extending downwardly from the front beam 11. Each leg carries a drive motor 24 for providing drive power to the respective wheel 21, 22 in response to the supply of hydraulic fluid from the control unit 20. The wheels 21 and 22 are mounted on hubs attached to the motors 24 so that the wheels are supported at a fixed angle to the frame so as to be parallel to each other and parallel to a center line 26 of the tractor. Thus the tractor is not steered by pivotal movements of the wheels which are fixed.

The rear beam 12 carries adjustable portions 28 and 29 which can be moved inwardly and locked by connecting bolts 30 at a required spacing from the center line 26 thus allowing adjustment of the track of the vehicle. Outwardly the beam also can be non-adjustable and this invention will work equally as well. The rear beam is mounted for pivotal movement on a center pivot 12A defining a horizontal axis longitudinal of the center line of the tractor. At the outer end of each portion 28, 29 is mounted a respective castor wheel 31 which can swivel around a vertical pivot member 32 of the castor. Thus the wheels on the beam 12 are castor wheels which are again not steered but merely free to rotate around the vertical axis defined by the pivot 32.

Tractors of this type are well known and are highly manoeuvrable since the steering is effected by differential speed or differential rotation of the wheels 21 and 22 with the castor wheels 31 merely following the steering action as required. It is well known that such tractors are generally used with the driven wheels 21 and 22 forward so that the implement is in front of those wheels.

However for high speed movement the vehicle is driven in the opposite direction so that the driven wheels 21 and 22 are at the rear and the castor wheels are at the front. This is known to provide an improved stability of the tractor at higher transport speeds and may provide an improved arrangement for transporting the implement when not in use. Each of the castor wheels 31 includes an optional damper 40 which connects between the castor wheel and the extendable portion 28, 29 of the tractor so as to prevent or reduce castor wheel shimmy.

Some optional steering control can be applied to the rear castor wheel to limit castor action at certain positions and in certain modes without deviating from the present invention.

Figure 4:
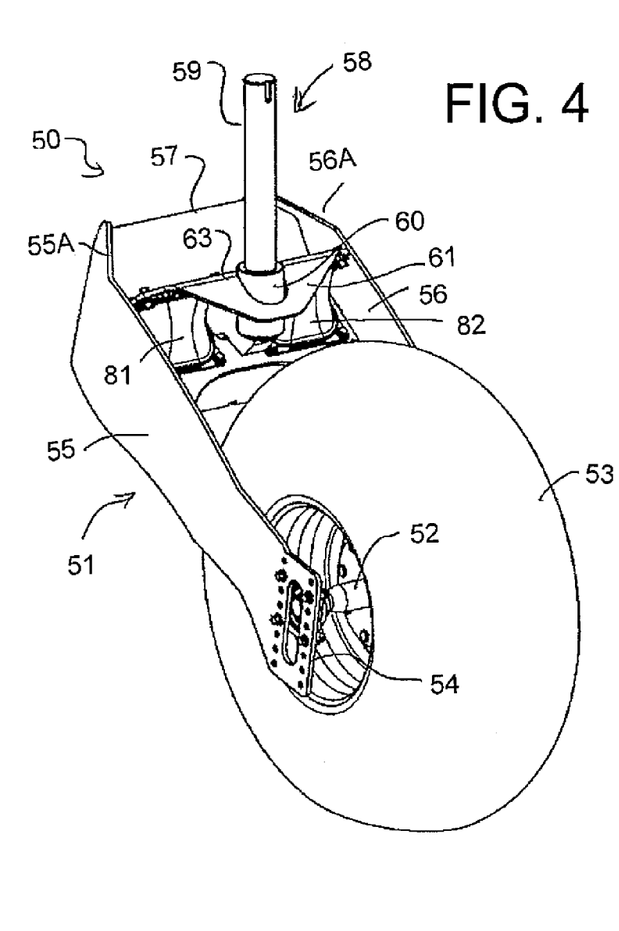
FIG. 4 is an isometric view from the rear and one side of the rear wheel of the tractor of FIG. 1.
Figure 5:
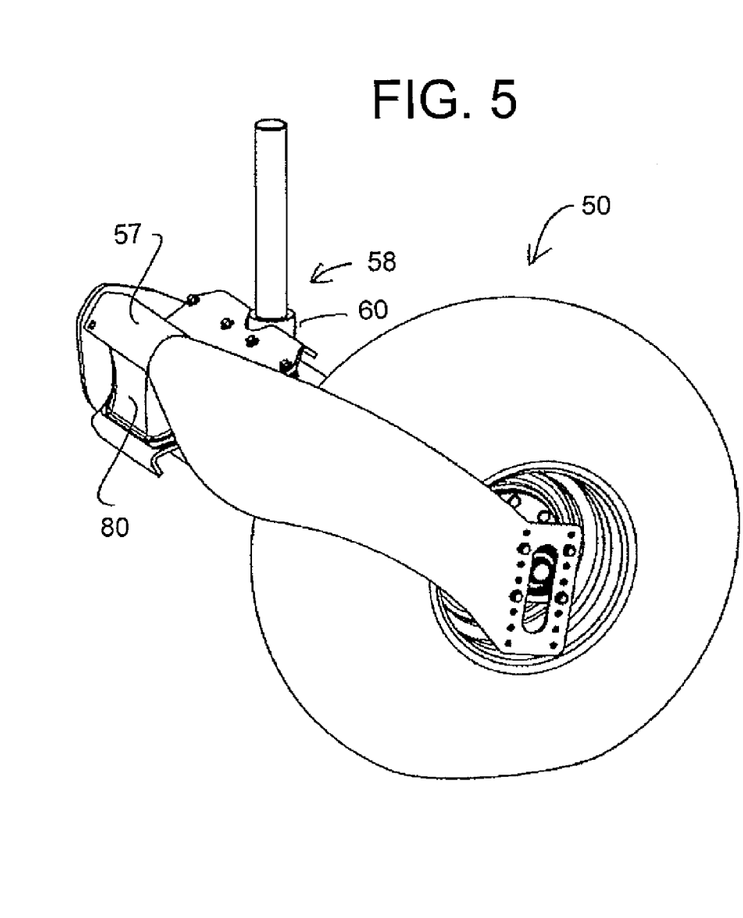
FIG. 5 is an isometric view from the front and one side of the rear wheel of the tractor of FIG. 1.
Figure 6:
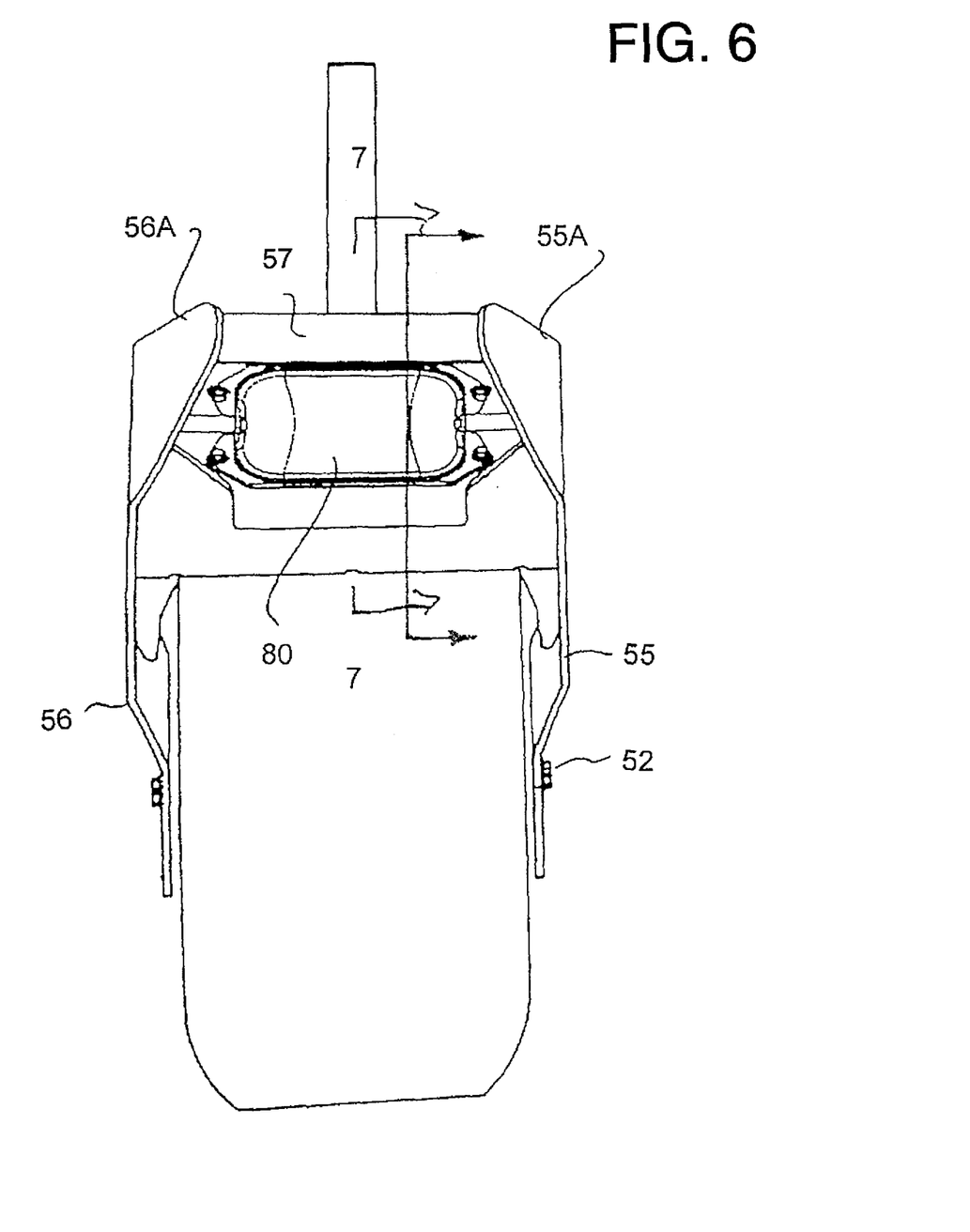
FIG. 6 is a front elevational view of the rear wheel of the tractor of FIG. 1.

As best shown in FIGS. 4 and 5, there is provided a ground wheel assembly 50 for supporting the above tractor relative to the ground which includes a ground wheel 53 having an axle 52 carried in a support arm 51 having the beam attached at a lower end of the support arm 51 in the form of a fork with two side plates 55 and 56 containing the axle therebetween. A plurality of optional adjustment holes allow vertical adjustment. At the forward end the side plates includes portions 55A and 56A which converge inwardly to reduce the width of the fork and are attached to a transverse connecting members 57 and 72 which hold the fork rigid and the side plates at fixed spacing.

The fork is carried on a mounting assembly 58 for attachment to the frame member of the agricultural vehicle. The assembly 58 includes the castor pin 59 for insertion into a receptacle on the beam of the frame with the pin carried in a collar 60 welded into a hole in a plate 61.

The plate 61 is inclined upwardly and forwardly from a rear end 62 behind the collar up to a transverse apex where the plate 61 is of increased width and the plate bends downwardly from the apex 63 to form a plate member 64 extending through the space between the side plates 55 and 56 with a width slightly less than the space therebetween to a lower end 65 which projects out below the bottom edges of the plates 55, 56 and includes a downturned flange 66 for stiffness.

The upper end of the forks includes a transverse stiffening channel 70 welded across the side plates 55, 56 underneath the mounting 58. On top of the channel 70 is attached a plate portion 71 which also bridges the side plates 55, 56 and includes a front edge 71A and a rear edge 71B.

Attached underneath the top stiffener channel 57 and extending across the plates 55, 56 is provided a second plate portion 72 with a front edge 72A and a rear edge 72B.

The plate portions 71 and 72 define a space between the edges 71A and 72B which allows the plate 64 to pass through at a bend portion 64A of the plate 64 without any direct connection between the plate 64 and the plate portions 71, 72. The plate 64 and the plate portions 71, 72 are thus generally planar and intersect adjacent the pivot axis therebetween and indicated at X in an X-shape.

In front of the axis X is provided a first suspension block 80 and behind the axis X is provided a pair of blocks 81, 82.

Thus the suspension system for connecting the support arm or fork 51 to the mounting assembly 58 provides generally up and down movement of the beam and the wheel carried thereby relative to the mounting assembly and the frame member attached thereto. The blocks also provide some shock absorption in the front to rear direction and some twist around a vertical axis to take up these loads if required.

The suspension system comprises the first plate assembly 64 attached to the mounting assembly and the second plate assembly 71, 72 attached to the support arm or fork 51.

The first and second plate assemblies are arranged for relative pivotal movement about the axis X which is generally parallel to the beam in response to the up and down movement of the beam 54.

The first elastomeric block arrangement formed by the single block 80 is located between the first and second plate assemblies on a front side of the axis more remote from the beam and the second elastomeric block arrangement defined by blocks 81, 82 is located between the first and second plate assemblies on a rear side of the axis closer to the beam 54.

As shown it will be clear that upward movement of the beam causes compression of the first and second elastomeric block arrangements with one in front of the axis X and one behind. As set forth above the first and second plate assemblies 64 and 71, 72 are connected only by the elastomeric block arrangements such that the location of the pivot axis X is determined by the compression of the elastomeric block arrangements.

The first and second plate assemblies are generally planar and intersect adjacent the pivot axis so as to define a generally X-shape between them. However it will be appreciated that this arrangement of the plates is convenient for the geometry and properly locates the blocks and the axis between them. However the plate portions on either side of the axis do not need to lie in the same plane.

It is convenient for the mounting of the system that the plate 64 is continuous through the pivot axis and carries the load back to the collar 60 so that the plate portions 71, 72 are separated at the axis into two separate components which are connected by components, that is the side plates of the fork outside the plate assemblies.

Each elastomeric block arrangements comprises a block 80, 81, 82 of an elastomeric material. The blocks are of similar construction so that the block 80 as an example has a first face 80A attached to the first plate 64 and a second face 80B attached to the second plate at portion 72. Each of the first and second faces 80A and 80B includes a flange portion 80C 80D projecting outwardly from the main body of the block at the face to define the face of the block for attachment to the plate which is of larger dimension in at least some directions than a cross section of the block adjacent the face. This provides an increased contact area for attachment to the plate.

Figure 3:
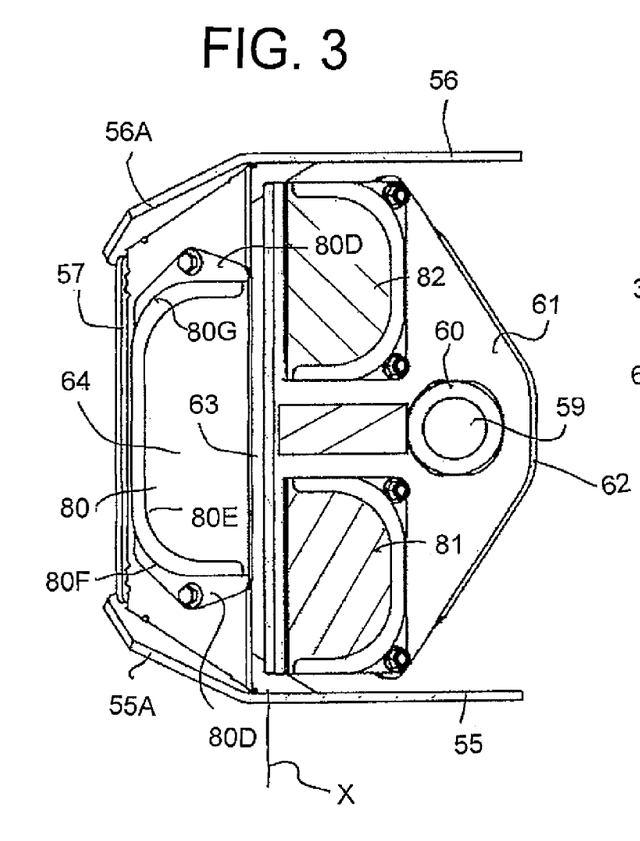
FIG. 3 is a cross-sectional view along the lines 3-3 of FIG. 2.

As best shown in FIG. 3 an outer surface 80E of each block, such as that block 80, where the outer surface 80E lies in an axial plane of the axis X and is spaced forwardly from the axis X is convexly curved to define curved corners 80F and 80G where the curved corners allow the block to be compressed and thus deform outwardly while spreading the load generally evenly throughout the block.

Figure 7:
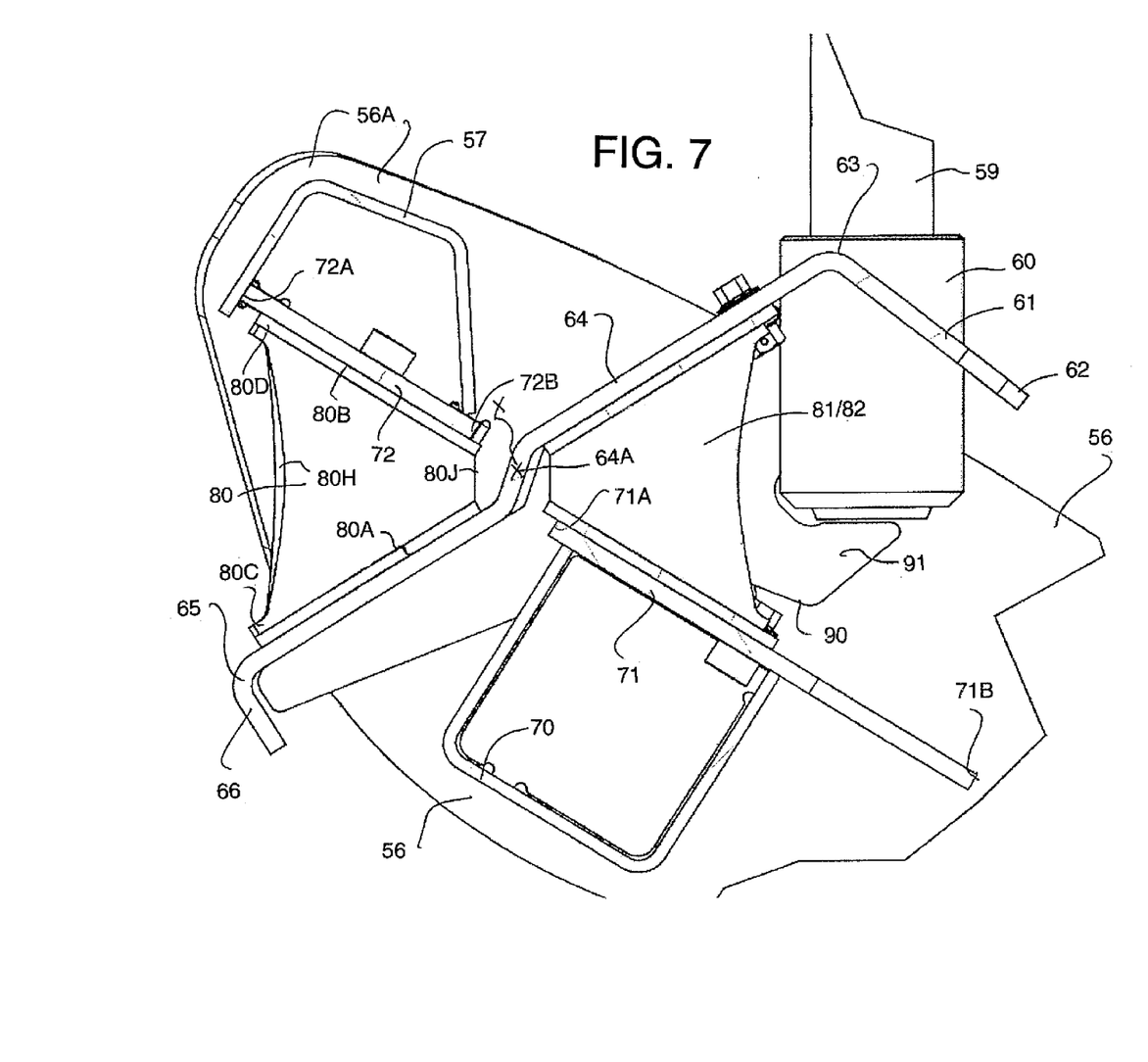
FIG. 7 is a cross-sectional view along the lines 7-7 of FIG. 6 which is offset from the center line of the caster assembly.

As best shown in FIG. 7, the X-shape of the plates provides an outer surface 80H of the block 80 which is much longer than an inner surface 80J adjacent the axis. The outer surface 80H of the block which surface lies in a radial plane of the axis X and is spaced from the axis is concavely curved from the flange 80C to the flange 80D so that the outer surface as the block is compressed between the plates by the upward movement of the beam bulges outwardly away from the axis X to reduce the concave curvature and possibly to move to a convex shape. It will be appreciated in this regard that the elastomer is substantially incompressible so that the material therein is not compressed but instead is moved by the movement of the surfaces 80A and 80B toward one another to cause bulging of the material toward the free outer surfaces of the block. The above selection of the positioning and shaping of the blocks is designed so that as far as possible the internal loads on the material of the block as the beam moves upwardly are substantially uniform through the block.

The casters are thus divided into two sections. The upper part forms the vertical caster pivot and the lower part contains the forks to which the wheel assembly is bolted. The two sections loosely overlap in a scissor-like fashion with a virtual horizontal pivot at the intersection point which is generally perpendicular to centerline of the tractor when the wheels are moving parallel to the centerline.

On either side of the intersection point are elastomer blocks bonded to steel plates and bolted into both sections. These elastomer blocks compress when machine weight is put on the tires in a static load. When operating on uneven surfaces generating dynamic loads, the blocks further deflect to absorb the impact so the machine components and the operator are somewhat isolated from the impacts. The increased wheel travel gained by the deflection allows the wheels to conform to the surface thereby keeping the casters on the ground and help prevent wheel shimmy.

It is also possible that the elastomer isolators will provide a dampening effect to reduce the tendency for casters to shimmy. A single stop member 90 can be provided at the rearmost block on a rear edge of a plate 91 which extends at right angles to the plate 64 underneath the collar 60. A bottom edge of the plate 91 thus will engage the top surface of the plate portion 71 to act as a stop when the rotation of the plate 71 in the counter-clockwise direction under dynamic load or excessive static load reaches a maximum desirable angle. This provides a degree of overload protection but still allows the front isolator block 80 to provide additional suspension, albeit stiffer due to the fact that the pivot now is around the stop 90. An additional stop could be also be located at a position aligned with the rear stop 90 but would make for a more abrupt stopping action.

The invention claimed is:

1. A ground wheel assembly for supporting an agricultural vehicle comprising:
    a ground wheel having an axle on which the wheel is carried for rotation;
    a support arm having the axle attached at a lower end of the support arm;
    a mounting assembly for attachment to a frame member of the agricultural vehicle;
    and a suspension system for connecting the support arm to the mounting assembly to provide generally up and down movement of the axle and the wheel carried thereby relative to the mounting assembly and the frame member attached thereto;
    the suspension system comprising:
        a first plate assembly attached to the mounting assembly;
        a second plate assembly attached to the support arm;
        the first and second plate assemblies being arranged for relative pivotal movement about an axis generally parallel to the axle in response to up and down movement of the axle;
        a first elastomeric block arrangement located between the first and second plate assemblies on a first side of the axis more remote from the axle;
        a second elastomeric block arrangement located between the first and second plate assemblies on a second side of the axis closer to the axle;
        the first and second elastomeric block arrangements being arranged such that upward movement of the axle causes compression of the first and second elastomeric block arrangements.

2. The ground wheel assembly according to claim 1 wherein the first and second plate assemblies are connected only by the elastomeric block arrangements such that a location of the pivot axis is determined by the compression of the elastomeric block arrangements.

3. The ground wheel assembly according to claim 1 wherein the first and second plate assemblies are generally planar and intersect adjacent the pivot axis.

4. The ground wheel assembly according to claim 1 wherein one of the first and second plate assemblies is continuous through the pivot axis and the other is separated at the axis into two separate components which are connected by components outside said one of the first and second plate assemblies.

5. The ground wheel assembly according to claim 1 wherein the first plate assembly is continuous through the pivot axis and the second plate assembly is separated at the axis into two separate components which are connected by two spaced side walls of the support arm.

6. The ground wheel assembly according to claim 5 wherein the spaced side walls each extend to the axle and are connected to respective ends of the axle.

7. The ground wheel assembly according to claim 1 wherein one of the elastomeric block arrangements comprises a single block and the other of the elastomeric block arrangements comprises a pair of side by side blocks.

8. The ground wheel assembly according to claim 7 wherein an outer surface of each block lying in an axial plane of the axis and spaced from the axis is convexly curved.

9. The ground wheel assembly according to claim 7 wherein an outer surface of each block lying in a radial plane of the axis and spaced from the axis is concavely curved so that the outer surface bulges as the block is compressed.

10. The ground wheel assembly according to claim 7 wherein each block is shaped such that internal strain of the block as the axle moves upwardly is substantially uniform through the block.

11. The ground wheel assembly according to claim 1 wherein the first elastomeric block arrangement comprises a single block and the second elastomeric block arrangement comprises a pair of separate side by side blocks.

12. The ground wheel assembly according to claim 1 wherein each elastomeric block arrangement comprises a block of an elastomeric material having a first face attached to the first plate assembly and a second face attached to the second plate assembly.

13. The ground wheel assembly according to claim 12 wherein each of the first and second faces includes a flange portion projecting outwardly to define the face of the block which is of larger dimension than a cross section of the block adjacent each of the first and second faces.

14. The ground wheel assembly according to claim 13 wherein each of the first and second faces is bonded to the respective plate assembly and each flame portion is bolted to the respective plate assembly.

15. The ground wheel assembly according to claim 1 wherein the mounting assembly comprises a vertical castor pivot.

16. An agricultural tractor comprising:
a tractor frame arranged for attachment to an implement to be moved in a longitudinal working direction;
a first pair of ground wheels mounted on the frame at positions spaced transversely of the frame on either side of a center line of the frame;
a transverse beam mounted on the frame at a position spaced longitudinally from the first pair of ground wheels;
a second pair of ground wheels mounted on the beam at respective ends thereof;
each of the second pair of ground wheels comprising a ground wheel assembly as claimed in claim 1.

17. The tractor according to claim 16 wherein the mounting assembly is arranged so that the tractor can move in a first direction of forward working movement with the first pair of ground wheels forward and the second pair of ground wheels trailing, and in a second direction of movement opposite to the first direction of forward working movement with the second pair of ground wheels forward and the first pair of ground wheels trailing.

18. The tractor according to claim 16 wherein each of the first pair of ground wheels is driven by a respective drive motor which allows variable speed in both the first and second directions such that steering of the tractor is effected by a differential in speed between the first pair of wheels, with the second pair of wheels following the steering in a castor action.

19. The tractor according to claim 16 wherein the beam is mounted on the frame for pivotal movement about a substantially horizontal axis along the center line of the tractor.

* * * * *